MULTIPLE INPUT SERVO MOTOR CONTROL SYSTEM

Original Filed May 25, 1964

INVENTORS
WILLARD J. OPOCENSKY
LEONARD E. LUDVIGSEN
BY
Joseph R. Dwyer
ATTORNEY

INVENTORS
WILLARD J. OPOCENSKY
LEONARD E. LUDVIGSEN
BY
Joseph R. Dwyer
ATTORNEY

INVENTORS
WILLARD J. OPOCENSKY
LEONARD E. LUDVIGSEN
BY
Joseph R. Dwyer
ATTORNEY

Jan. 30, 1968  L. E. LUDVIGSEN ET AL  3,366,859
MULTIPLE INPUT SERVO MOTOR CONTROL SYSTEM
Original Filed May 25, 1964  10 Sheets-Sheet 3

INVENTORS
BY

ATTORNEY

INVENTORS
WILLARD J. OPOCENSKY
LEONARD E. LUDVIGSEN
BY
Joseph Dwyer
ATTORNEY

Jan. 30, 1968 L. E. LUDVIGSEN ET AL 3,366,859
MULTIPLE INPUT SERVO MOTOR CONTROL SYSTEM
Original Filed May 25, 1964 10 Sheets-Sheet 4

INVENTORS
BY

ATTORNEY

INVENTORS
WILLARD J. OPOCENSKY
LEONARD E. LUDVIGSEN
BY
Joseph A. Dwyer
ATTORNEY

Jan. 30, 1968 L. E. LUDVIGSEN ET AL 3,366,859

MULTIPLE INPUT SERVO MOTOR CONTROL SYSTEM

Original Filed May 25, 1964 10 Sheets-Sheet 6

INVENTORS

WILLARD J. OPOCENSKY
LEONARD E. LUDVIGSEN
BY

Joseph Dwyer

ATTORNEY

Jan. 30, 1968 L. E. LUDVIGSEN ETAL 3,366,859

MULTIPLE INPUT SERVO MOTOR CONTROL SYSTEM

Original Filed May 25, 1964 10 Sheets-Sheet 7

INVENTORS
WILLARD J. OPOCENSKY
LEONARD E. LUDVIGSEN
BY

ATTORNEY

INVENTORS
WILLARD J. OPOCENSKY
LEONARD E. LUDVIGSEN
BY
ATTORNEY

INVENTORS
WILLARD J. OPOCENSKY
LEONARD E. LUDVIGSEN
BY
Joseph R. Dwyer
ATTORNEY

INVENTORS
WILLARD J. OPOCENSKY
LEONARD E. LUDVIGSEN
BY
Joseph Dwyer
ATTORNEY

Jan. 30, 1968    L. E. LUDVIGSEN ET AL    3,366,859
MULTIPLE INPUT SERVO MOTOR CONTROL SYSTEM
Original Filed May 25, 1964    10 Sheets-Sheet 10

INVENTORS
BY

ATTORNEY

United States Patent Office 3,366,859
Patented Jan. 30, 1968

3,366,859

MULTIPLE INPUT SERVO MOTOR CONTROL SYSTEM

Leonard E. Ludvigsen, Montebello, and Willard J. Opocensky, Glendale, Calif., assignors to General Precision Systems Inc., a corporation of Delaware Original application May 25, 1964, Ser. No. 369,714. Divided and this application Apr. 5, 1966, Ser. No. 581,398
3 Claims. (Cl. 318—19)

ABSTRACT OF THE DISCLOSURE

Mechanical apparatus for computing the quantity of each of the tristimulus colors that are present in a color sample being analyzed by a spectrophotometer. The spectrophotometer output drives tristimulus response cams which control the ball positions on ball and disk integrators. Since these integrators will be damaged by continuous operation in their ZERO positions, means are provided to disengage an integrator except during the period it is to perform an integration operation. Special test circuitry is provided for determining the presence of malfunctions, and whether they are in the computing apparatus or in the spectrophotometer.

This application is a division of application Ser. No. 369,714, filed May 25, 1964, and later abandoned in favor of a continuation application, Ser. No. 547,707, filed Apr. 18, 1966, and now Patent No. 3,329,335.

The present invention relates to mechanical computing apparatus of the type involving the simultaneous operation of several integrators to obtain the product of one function with a plurality of other functions. Computing apparatus of this type are required, for instance, to obtain the I.C.I. tristimulus values of a specimen from the data supplied by a spectrophotometer as the spectrophotometer is in operation to supply the data for drawing a spectrophotometric analysis curve for the specimen.

The invention aims to reduce wear in apparatus of the type referred to so that it may produce accurate results over long periods of use. In addition, the present invention aims to equip an apparatus, of the type referred to, with simple, yet dependable means for testing its accuracy independently from and without the cooperation of any data supplying apparatus whose accuracy may be open to doubt.

A preferred exemplary embodiment of the invention is illustrated in the accompanying drawings wherein.

The expemplary embodiment of the invention illustrated in the accompanying drawings is specifically designed to process the objective data concerning the special energy distribution of light transmitted by, or reflected from, a specimen as obtained from a spectrophotometer, with the aid of cams that represent the principal color receptors of the average human retina, to supply the tristimulus values which specify the color of the examined specimen as it appears to an average observer. It will be understood that an apparatus incorporating the principles of the present invention may be employed in connection with other data supplying apparatus wherever it is desirable to product the product of one function with a plurality of other functions.

Conventional spectrophotometers supply a response indicating the light energy transmitted by, or reflected from, a specimen at predetermined different wavelengths of the light employed to illuminate, passed through, or reflected from the specimen, and this response is generally depicted graphically by moving a stylus transversely in either direction across a unidirectionally moving chart whose advance represents the different wavelengths at which the energy response of the specimen is determined. The resultant curve represents the objective color response of the specimen, and the exemplary computing apparatus illustrated in the accompanying drawings is designed to introduce the subjective receptivity of the average human eye for the three principal colors into the data supplied by the spectrophotometer, to furnish a numerical specification of the color sensation of the specimen upon the human eye.

The output of a spectrophotometer is usually supplied by a rotary shaft that turns a drum which carries the chart and whose rotation represents the spectrum of the wavelengths at which the color reflection and/or the transmission of the specimen is tested; and as the drum is turned another output component of the spectrophotometer moves a stylus across the chart in a direction transverse to the movement of the chart to indicate the energy response of the specimen at the different wavelengths.

Figure 2:
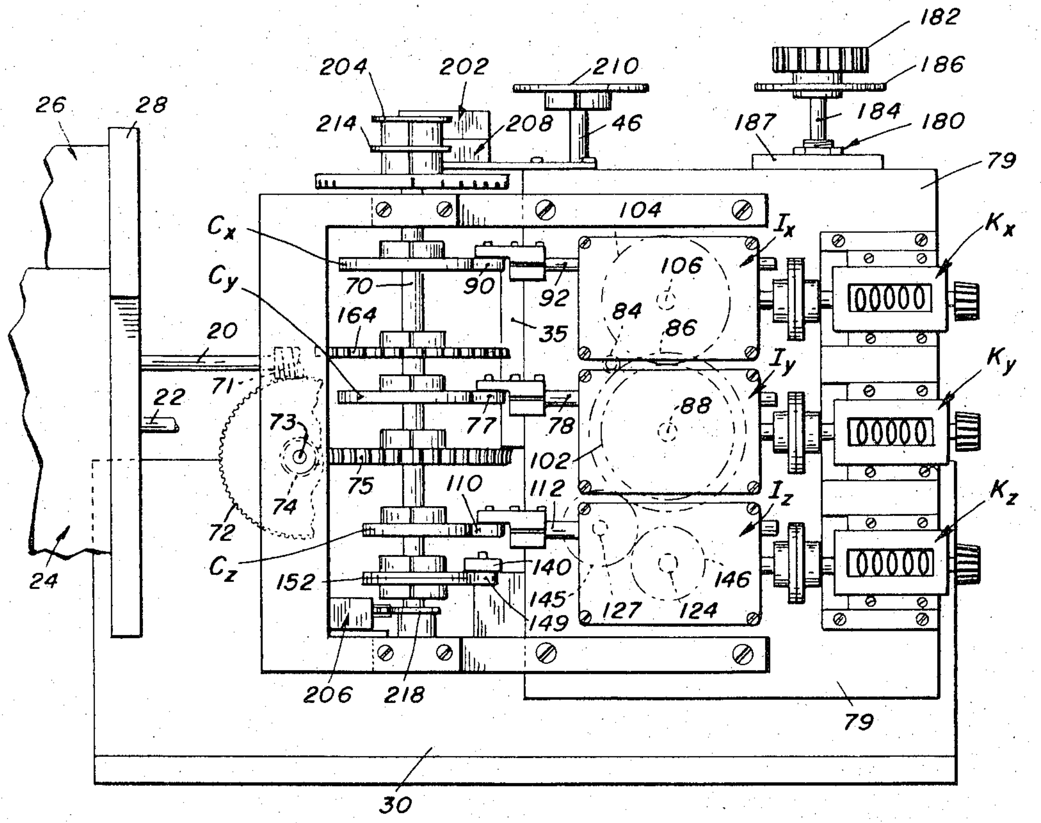
FIGURE 2 is a front elevation of the apparatus with its cover removed, as viewed in the direction of the arrows 2—2 of FIGURE 1.
Figure 3:
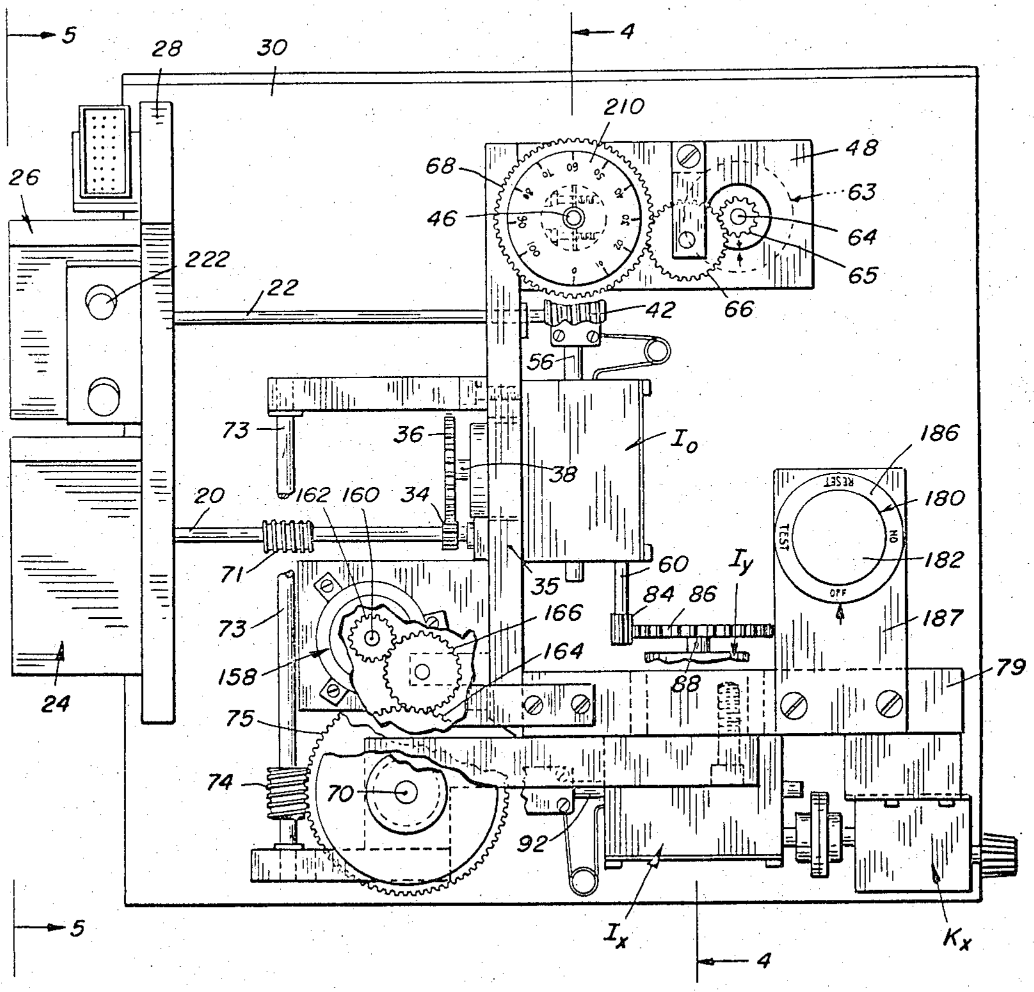
FIGURE 3 is a plan view of the apparatus as viewed in the direction of the arrows 3—3 of FIGURE 1.
Figure 5:
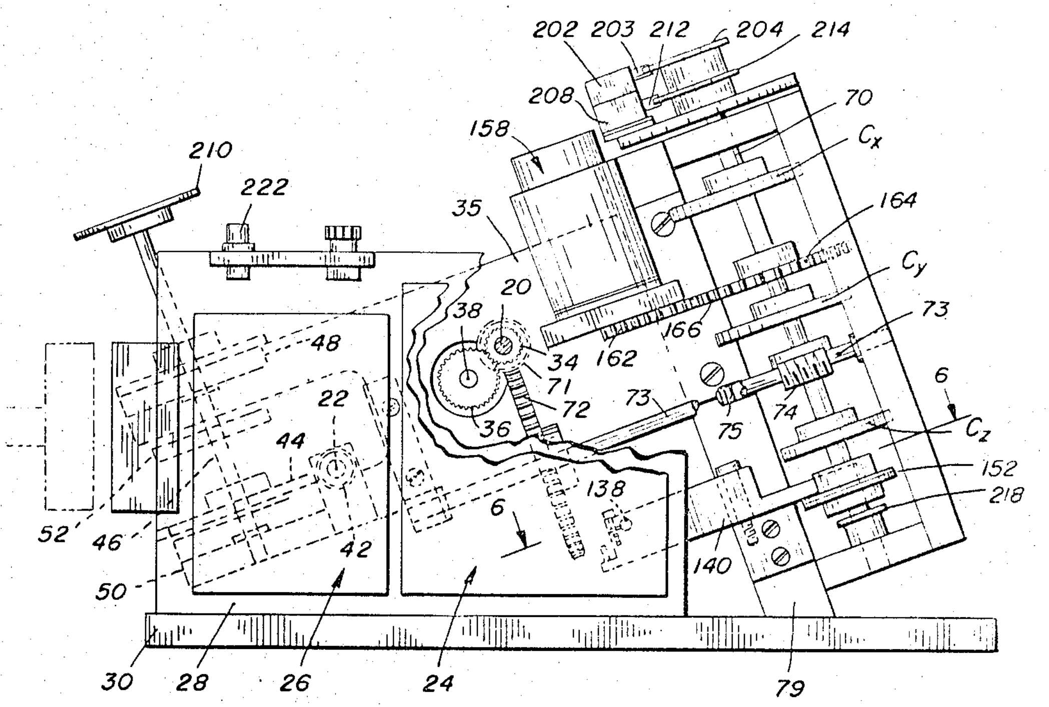
FIGURE 5 is a fragmentary end elevation of the apparatus viewed from the side opposite to FIGURE 1.
Figure 9:
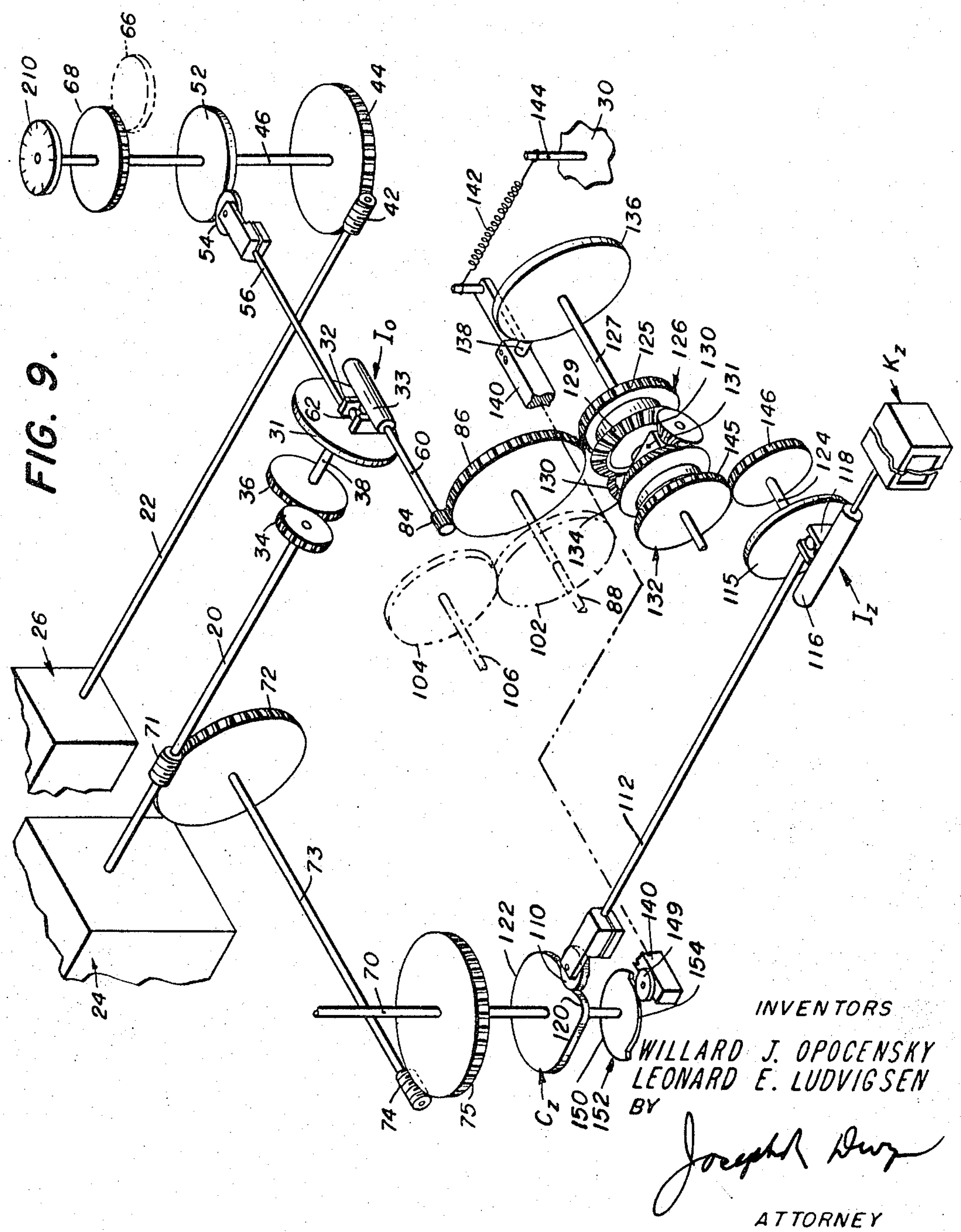
FIGURE 9 is an exploded perspective of the mechanical power train from an input shaft of the apparatus to one of the output counters thereof.

Accordingly, the apparatus of the invention comprises two input shafts 20 and 22 (FIGURES 2, 3 and 9). Shaft 20 is to receive the same rotary motion as the chart-supporting drum of the photospectrometer and will, therefore, hereinafter be referred to as the "wavelength shaft," and shaft 22 is to receive the same reciprocating motion as the stylus of the spectrophotometer and will therefore hereinafter be referred to as the "reflectance shaft." While the drum and stylus moving components of the spectrophotometer may be coupled directly by mechanical means to the shafts 20 and 22, respectively, it is usually preferable to employ servo motors controlled by synchro systems to drive the shafts 20 and 22 in precise synchronism with the named output components. Having reference to FIGURES 3, 5 and 9, the shafts 20 and 22 are driven by servo motors 24 and 26, respectively, that are secured to a vertically disposed plate-shaped support 28 of the machine frame, which is mounted upon a base plate 30 along the left side edge thereof, and hereinafter said motors 24 and 26 will be referred to as the "wavelength motor" and the "reflectance motor," respectively.

The first computation performed by the apparatus of the invention is the integration of the area defined by and between the curve that the stylus of the spectrophotometer plots upon the chart and the abscissa of said chart. The area of said curve is representative of the color scheme of an examined specimen in an objective sense. For this purpose the wavelength shaft 20 is arranged to turn the input disk 31 of a ball and disk integrator $I_0$ while the osecillations of the reflectance shaft 22 are arranged to locate, radially of said disk, the ball bearing carriage 32 of the integrator, which transmits the rotation of the input disk to the output cylinder 33 of said integrator (FIGURE 9). Having reference to FIGURES 3 and 9, the end of shaft 20 is journaled in a transversely extending wall or partition 35 of the machine frame and carries a gear 34 which meshes with another gear 36 of a significantly larger diameter, that is mounted upon the input spindle 38 of the integrator $I_0$. Said spindle carries firmly secured thereto the herein aforementioned input disk 31 (FIGURE 9). Whenever the apparatus of the invention is in operation, the input spindle 38, therefore, turns said disk 31 at a constant speed corresponding to the speed of rotation of the recording drum of the spectrophotometer.

The end of shaft 22 (which oscillates in synchronism with the reciprocative movement of the stylus of the spectrophotometer) carries a worm 42 that meshes with a worm gear 44 which is secured to a vertically disposed shaft 46 (FIGURE 9). Shaft 46 is suitably journaled in vertically spaced shelves 48 and 50 (FIGURE 4) that are secured to and project laterally from the hereinbefore mentioned partition 35. Above worm gear 44 the shaft 46 carries firmly secured thereto a snail cam 52 whose edge is engaged by a cam follower roller 54 that is pivotally supported at the end of a rod 56 (FIGURE 9). Said rod extends slidably into the interior of the integrator $I_0$ into the space between the input disk 31 and the output cylinder 33 thereof and mounts the hereinbefore mentioned carriage 32 that holds superposed balls in contact with each other and with the surface of the disk 31 and the surface of the cylinder 33, respectively, so that said balls may transmit the rotation of said disk to said cylinder. Depending upon the location of the carriage 32 radially of the disk 31, the balls impart different speeds from the uniformly rotating disk 31 to the cylinder 33. The speed imparted to said cylinder will be at a maximum when the balls are in contact with the peripheral area of the disk 31, and will be zero when the balls are located at the center of the disk. During operation of the apparatus the location of the balls 62 radially of the disk 31 is determined by the rotary position of the snail cam 52, and the position of said cam in turn is determined by the oscillations of the reflectance shaft 22 that are imparted to said shaft by the servo motor 26 in synchronism with the motion of the stylus-driving output component of the spectrophotometer. The number of revolutions of the output spindle 60 of the integrator cylinder 33 per operational cycle of the apparatus, therefore, represents the area defined by and between the curve plotted by the stylus of the spectrophotometer and the abscissa determined by operation of the recording drum of the spectrophotometer. Said area is a measure of the light energy reflected from, or transmitted by, the specimen under observation in the spectrophotometer over a predetermined spectrum of wavelengths.

Figure 1:
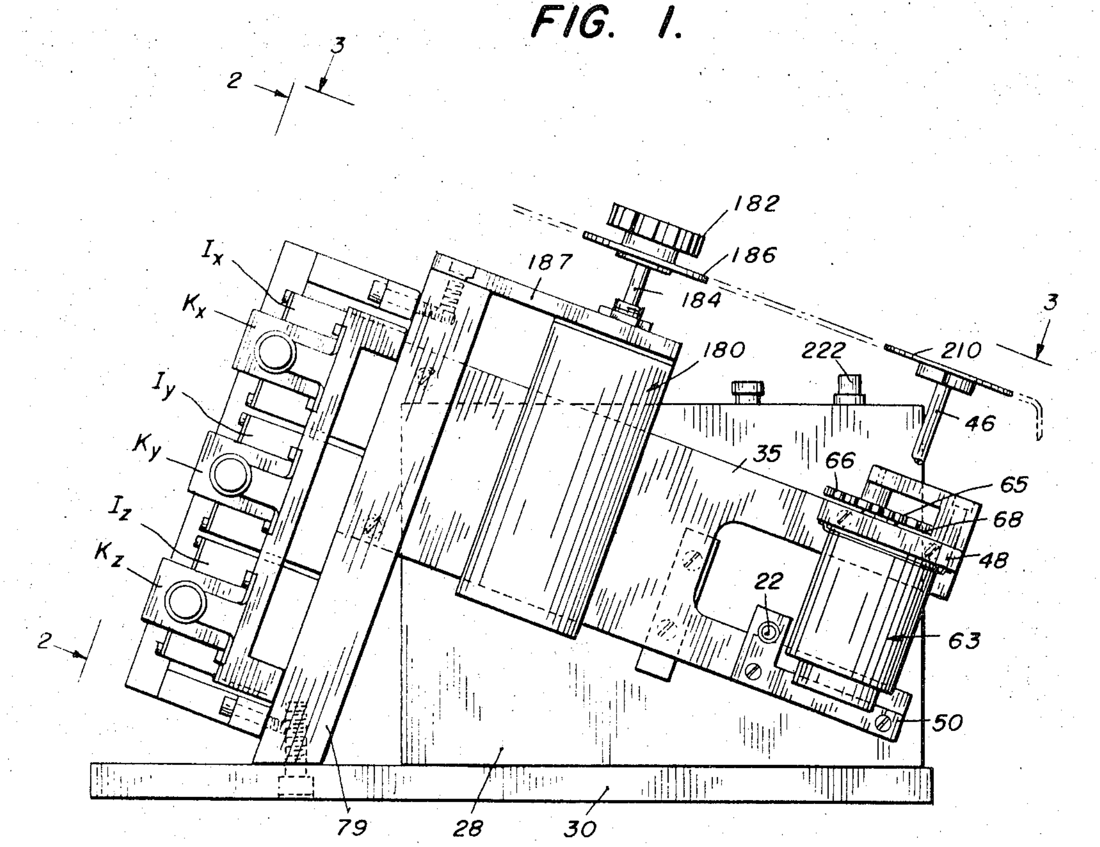
FIGURE 1 is an end elevation of a computing apparatus embodying the invention, viewed from a point to the right of its front.

Operation of the servo motor 26 to oscillate the snail cam 52 is synchronism with the reciprocatory motion of the stylus of the remotely located spectrophotometer is controlled by a synchro system including a synchro control transformer 63 (FIGURES 1 and 3). Said control transformer is supported by the laterally projecting shelves 48 and 50 of partition 35 adjacent the shaft 46 of snail cam 52, and is monitored by rotation of said shaft. For this purpose the rotor shaft 64 of the control transformer and the cam shaft 45 are operatively connected by a gear train which comprises a gear 65 that is secured to the rotor shaft 64, an idler 66 that is pivotally supported from the shelf 48 and which meshes with the gear 65, and a large diameter gear 68 that is firmly secured to the cam shaft 46 and which meshes with the idler 66 (FIGURES 3 and 9).

Figure 10:
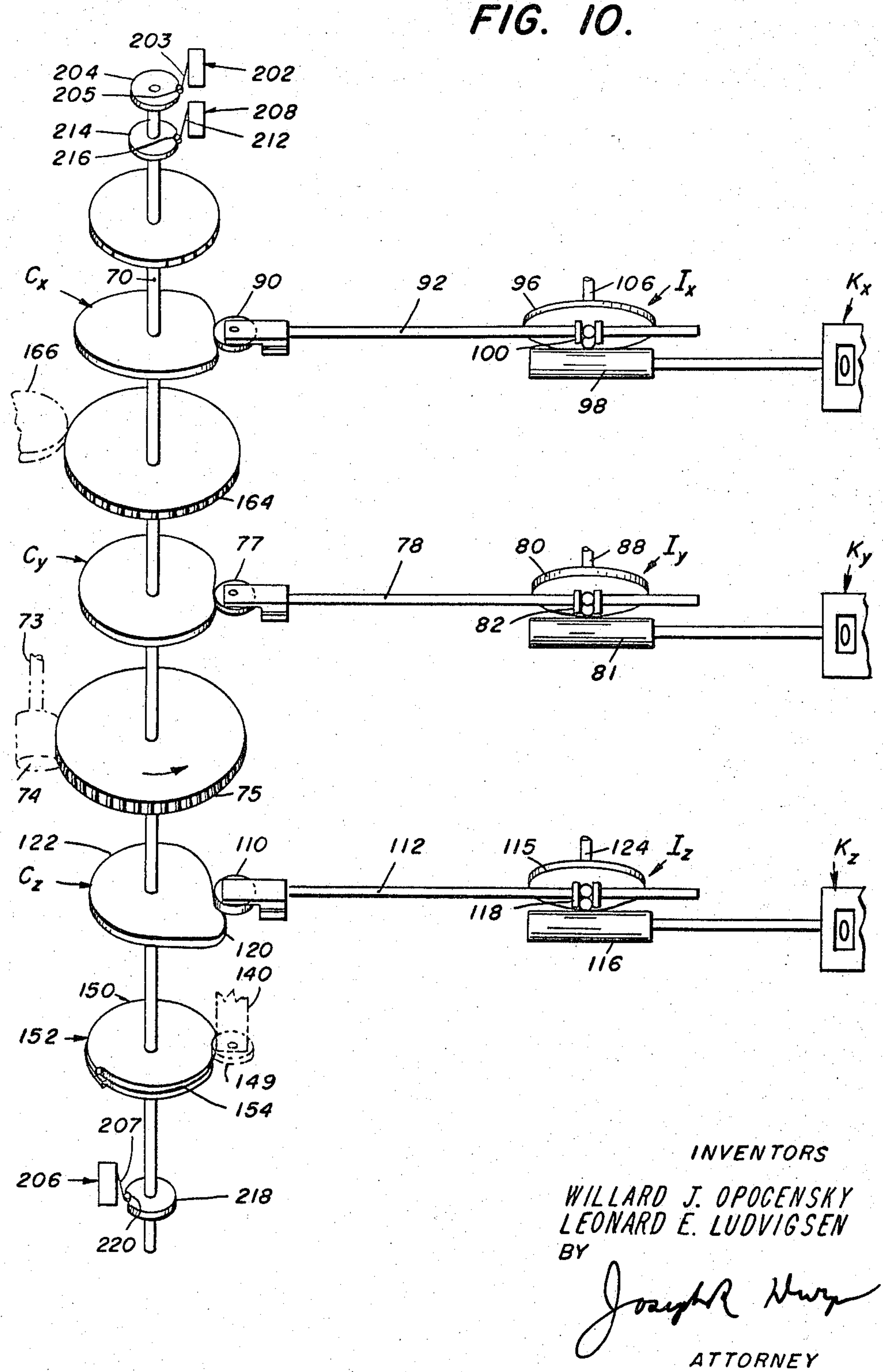
FIGURE 10 is a perspective of a cam shaft comprised in the apparatus of the invention and of the cams mounted thereon and the integrators and switches controlled by said cams.

As pointed out hereinbefore, the rotary speed, i.e., the number of revolutions per operational cycle of the output spindle 60 of integrator $I_0$ represents the objective measure of the energy transmitted by, or reflected from a specimen under examination by the spectrophotometer through a predetermined spectrum of wavelengths. The computing apparatus of the invention comprises means whereby the output of integrator $I_0$ is combined with the excitation curves for the three principal receptor mechanisms of the average human retina under a predetermined standard illumination, such as average noon sunlight or artificial sunlight as produced by special forms of lamps. The perceptivity of the three principal receptor mechanisms of the human eye under standard illumination conditions may be represented by three cams $C_x$, $C_y$ and $C_z$ of predetermined contours (FIGURE 10). Cams of this type are well known in the art, and the manner in which they are designed is described in detail in U.S. Patent No. 1,799,134 to Arthur C. Hardy. In the apparatus of the invention said cams $C_x$, $C_y$ and $C_z$ are arranged to rotate through a predetermined angle during each test cycle of the apparatus, to locate the ball carriages of three ball and disk integrators $I_x$, $I_y$ and $I_z$ in a direction radially of the disks of said integrators while said disks are driven at continually varying speeds by the output spindle 60 of integrator $I_0$; and the output speeds of the cylinders of said three integrators $I_x$, $I_y$ and $I_z$, i.e., the number of revolutions of said cylinders per test cycle of the apparatus are a direct numerical measure of the total effect produced by the color stimuli of the specimen under observation on the average human eye.

Having reference to FIGURES 2, 5, 7 and 9, the three cams $C_x$, $C_y$ and $C_z$ are firmly mounted in axially spaced relation upon a reclining shaft 70 that is suitably journaled in the frame of the apparatus. During the performance of the apparatus said shaft 70 is driven slowly and at a constant speed through a predetermined rotary angle by the hereinbefore described wavelength motor 24 which represents the rotation of the recording drum in the spectrophotometer as pointed out hereinbefore. For this purpose the shaft 20 carries a worm 71 (FIGURES 3 and 9) that meshes with a large diameter worm gear 72 (FIGURE 7) which is mounted upon a shaft 73 (FIGURE 9) that is suitably journaled to the frame of the machine. Said shaft 73 carries another worm 74 which meshes with another worm gear 75 that is firmly mounted upon the cam shaft 70.

Operation of the wavelength motor 24 is controlled in synchonism with the wavelength output component of the photospectrometer by a syncho control system that comprises a synchro control transformer 158 (FIGURES 3 and 5) which is mounted upon the machine frame adjacent the cam shaft 70 and which is monitored by the rotary position of said shaft. For this purpose the rotor shaft 160 of said transformer is provided with a small gear 162; and a large gear firmly secured to the cam shaft 70, is operatively connected to said gear 162 through an idler 166 that is pivotally supported from the machine frame intermediately of, and in mesh with, both the gears 162 and 164.

The intermediate cam $C_y$ represents the sensitivity of the receptor mechanism of the human retina for the green color, and its contour is engaged under the urgency of a spring by a cam follower roller 77 (FIGURES 2 and 10) that is pivotally supported from a rod 73. The rod 78 is slidably supported in the outer casing of an integrator $I_y$ which is secured to an inclined mounting plate 79 that rises from an area near the front edge of the base plate 30 (FIGURES 1 and 2). The rod 78 extends into, and supports in the space between the disk 80 and the cylinder 81 of said integrator $I_y$ a ball carriage 82 (FIGURE 10) in such a manner that the position of said carriage radially of the integrator disk is determined by the contour of the cam $C_y$ as it rotates with shaft 70. The disk 80 of the integrator $I_y$ is driven from the output spindle 60 of integrator $I_0$, and for this purpose said output spindle carries a spur gear 84 (FIGURES 4 and 9) that meshes with a gear 86 of a substantially larger diameter, which is firmly secured to the input spindle 88 of the disk 80 of integrator $I_y$.

The uppermost cam $C_x$ represents the perceptivity of the human retina for the violet color, and under the urgency of a spring its edge is engaged by a cam follower roller 90 that is pivotally supported at the end of a rod 92 (FIGURES 2 and 10). The rod 92 is supported for axially sliding movement in the outer casing of the integrator $I_x$ which is secured to the inclined mounting plate 79 above integrator $I_y$. The rod 92 extends into, and supports within, the space between the disk 96 and the cylinder 93 of said integrator a ball carriage 100 in such a manner that the position of the rotation-transmitting balls of said carriage in a direction radially of the disk 96 of the integrator $I_x$ is driven from the output spindle 60 of the integrator $I_0$, and for this purpose the gear 86 on the input spindle 88 of integrator $I_y$ carries pinned thereto another gear 102 of somewhat smaller diameter which meshes with yet another gear 104 of equal diameter that is firmly mounted upon the input spindle 106 of the integrator disk 96 (FIGURES 9 and 10).

Figure 4:
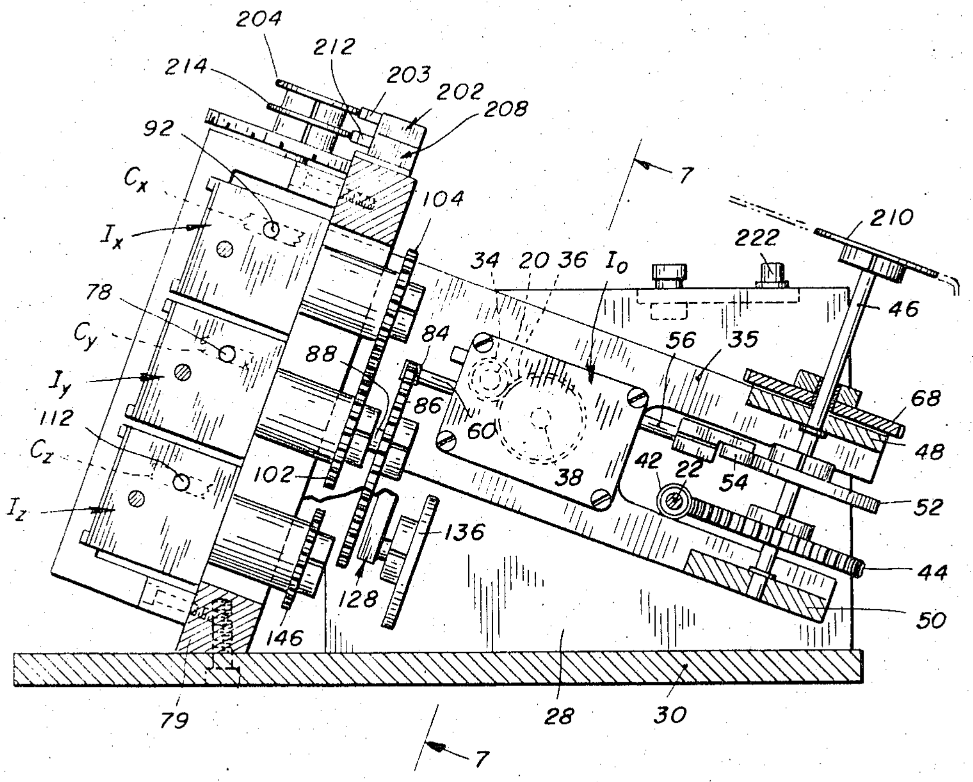
FIGURE 4 is a vertical transverse section through the apparatus taken along line 4—4 of FIGURE 3 and viewed in the direction of the arrows associated with said line.

The lowermost cam $C_z$ represents the perceptivity of the human retina for the red color and under the urgency of a spring its edge is engaged by a cam follower roller 110 that is pivotally supported from the end of a rod 112. The rod 112 is slidably supported in the walls of the casing of the integrator $I_z$ which is secured to the repeatedly mentioned inclined supporting plate 79 of the machine frame below the integrator $I_y$ (FIGURES 2 and 4). The rod 112 extends into, and carries within, the space between the integrator disk 115 and the integrator cylinder 116 a ball carriage 118 in such a manner that the location of the rotation-transmitting balls of said carriage in a direction radially of the disk 115 is determined by the contour of said cam. The input disk 115 of integrator $I_z$ is likewise driven from the output spindle 60 of the integrator $I_0$.

The receptor mechanism of the human eye for red color is active only over a sharply defined and relatively narrow band of wavelengths and is completely inactive at either side of said band of wavelengths. The contour of the cam $C_z$ representing perceptivity of the human eye for the red color, therefore, has a steep lobe 120 (FIGURE 10) of relatively short angular duration and a major sector 122 of uniform radius that is designed to keep the ball carriage of integrator $I_z$ at the center point of the disk 115 so that no movement be transmitted to the output cylinder 116. During performance of the apparatus, therefore, the balls of the carriage 118 of integrator $I_z$ would ordinarily idle in the center of the disk 115 during a major portion of each operational cycle. In time this is liable to erode into the center of the disk 115 a cavity or depression which would impair the dependability of the output of the integrator $I_z$, and thus shorten its useful lifetime. In accordance with the invention, means are therefore provided which suspend operation of the power train between the output spindle 60 of integrator $I_0$ and the input spindle 124 of the integrator disk 115 over a major portion of each operational cycle of the apparatus, and re-establish the power train only for the relatively brief period of time when the lobe 120 of cam $C_z$ becomes effective to move the ball carriage 118 of the integrator radially out of its zero position relative to disk 115. In this manner the disk 115 is protected from premature wear.

Figure 6:
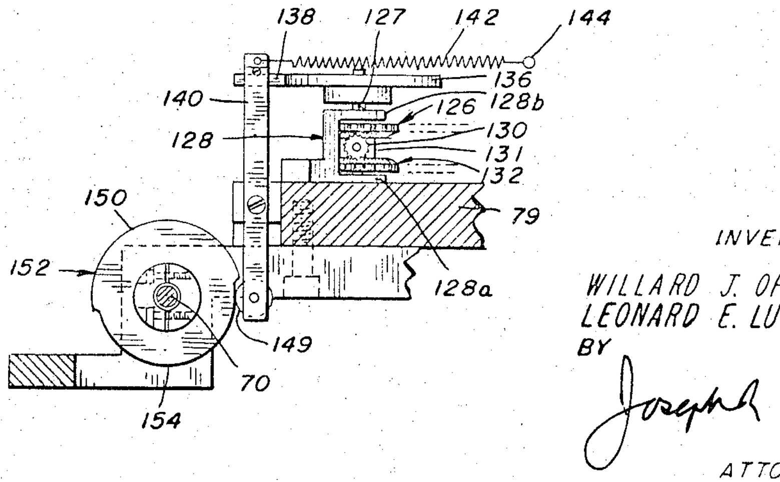
FIGURE 6 is a detail view representing a section through the apparatus taken along line 6—6 of FIGURE 5 and viewed in the direction of the arrows associated in said line.
Figure 7:
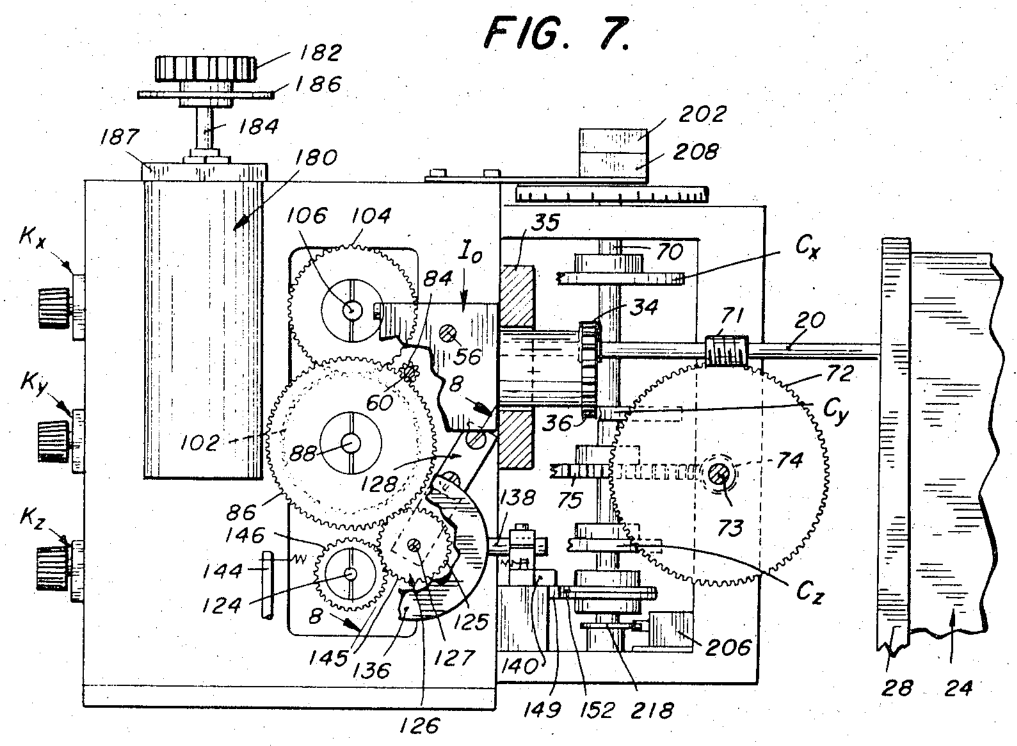
FIGURE 7 is a longitudinal section through the apparatus taken along line 7—7 of FIGURE 4 and viewed from the rear of the apparatus.
Figure 8:
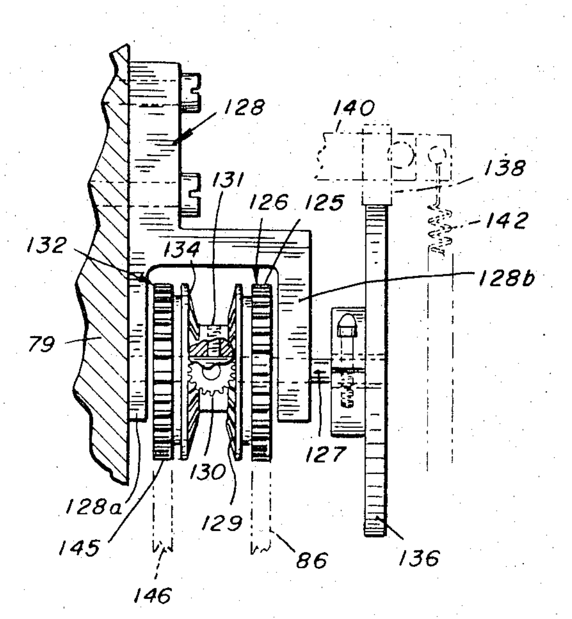
FIGURE 8 is a detail view representing a section taken along line 8—8 of FIGURE 7 and viewed in the direction of arrows associated with said line.

Having reference to FIGURES 4, 7 and 9, the large diameter gear 86 which is mounted on, and imparts rotation to, the input spindle 88 of the integrator $I_y$, meshes with the toothed circumferential edge 125 of a wheel structure 126 (FIGURE 8) that is rotatably supported upon a short transverse shaft 127. Said shaft 127 is rotatably supported in the prongs $128_a$ and $128_b$ of a fork-shaped bracket 128 that is secured to the inclined mounting plate 79 of the machine frame at the rear surface thereof. One side of the wheel structure 126 is provided with a bevelled ring gear 129, and said ring gear 129 is engaged by two pinions 130 which are pivoted to the opposite ends of a spider bar 131 that is firmly secured to the shaft 127 adjacent the wheel structure 126. Rotatably supported upon the shaft 127 on the other side of the spider bar 131 is another wheel structure 132 of the same size and formation as the wheel structure 126. The inner face of said second wheel structure 132 is provided with a bevelled ring gear 134 that meshes with the pinions 130. The shaft 127 protrudes through the outer prong $128_b$ of the bracket 128, and its projecting end carries firmly secured thereto a large diameter disk 136. Means are provided for maintaining the disk 136 and hence the shaft 127 in a stationary condition, and for this purpose a brake shoe 138 is held in one end of a two-armed lever 140 which is pivotally supported from the inclined mounting plate 79 of the machine frame (FIGURE 6). A strong spring 142 tensioned between one end of the brake lever 140 and an appropriately located stud 144 is arranged to urge the brake shoe 138 into braking contact with the edge of the disk 136. As long as the disk 136 is held in a stationary condition, the shaft 127 cannot turn and therefore the spider bar 131 secured to said shaft remains stationary in space. In this condition any rotation imparted to the wheel structure 126 by the large diameter gear 86 is transmitted to the second wheel structure 132 through the pinions 130, and is effective to turn said second wheel structure 132. The wheel structure 132 has a toothed circumferential edge 145 which meshes with another gear 146 of approximately equal diameter, that is secured to the input spindle 124 of the integrator $I_z$, (FIGURES 9 and 10) so that said input spindle is turned whenever the pinions 130 impart rotation to the wheel structure 132.

Ordinarily, the brake shoe 138 is held withdrawn from the edge of the disk 136 against the urgency of spring 142 so that said disk 136 and hence the shaft 127 and the pinion-carrying spider bar 131 mounted upon said shaft 124 are free to rotate. For this purpose the opposite arm of the brake lever 140 carries pivoted thereto a cam follower roller 149 (FIGURE 6) that engages a dwell 150 in the contour of a control cam 152 which is firmly mounted on, and turns with, drive shaft 70 of the color perceptivity cams $C_x$, $C_y$ and $C_z$. Said dwell 150 is of such angular width and location relative to the cam $C_z$ that it disables the brake shoe 138 during the time when the cam $C_z$ presents the inactive sector 122 of its contour to the cam follower roller 110 at the end of the rod 112 which mounts the ball bearing carriage 118 of integrator $I_z$. When the brake shoe 138 releases the disk 136, the shaft 127 and the spider bar 131 are free to rotate. In this condition the pinions 130 at the end of spider bar 131, are unable to impart rotation from the driving wheel structure 126 to the driven wheel structure 132 on the other side of said spider bar 131. They merely march idly along the bevelled ring gear 134 of the wheel structure 132 while said structure remains stationary and is therefore enabled to impart rotation to the input spindle 124 of integrator $I_z$. Hence, the input disk 115 of said integrator $I_z$ remains at rest as long as its ball bearing carriage 118 is located at its center, and the ball of said carriage which engages the disk, is therefore unable to erode the center area of the disk.

However, as soon as rotation of the cam shaft 70 presents the solitary lobe 120 of cam $C_z$ to the cam follower roller 110 at the end of the carriage-positioning rod 112, the brake-control cam 152 moves a sector of lesser radius 154 underneath the cam follower roller 149 on brake lever 140 (FIGURE 6) and permits the spring 142 to bring the brake shoe 138 into contact with the edge of disk 136. Now the shaft 127 and the spider bar 131 are held rigidly in whatever angular position they may have assumed at the moment, and the pinions 130 at the ends of said spider bar become effective to transmit the motion of the driving wheel structure 126 in an opposite direction to the wheel structure 132. Said wheel structure 132, therefore, turns the gear 146 on the input spindle of integrator $I_z$ and as a result thereof the disk of said integrator commences to rotate and continues to rotate until the cam follower roller 110 at the end of its carriage-positioning rod 112 has negotiated the solitary lobe 120 of cam $C_z$, when the dwell 150 of brake control cam 152 moves again underneath the cam follower roller 149 on lever 140 and causes the brake shoe 138 to release the edge of brake disk 136. Thus, the power train from the output spindle 60 of integrator $I_0$ to the input spindle 124 of integrator $C_z$ is again interrupted and rotation of the disk 115 of said integrator comes to a half.

As explained hereinbefore, the number of rotations of the output spindles of the integrators $I_x$, $I_y$ and $I_z$ during each test rotation of the cam shaft 70 is a direct measure of the transmittance or reflectance of an analyzed specimen as perceived by the three principal color perceptors of the average human eye under standard conditions of illumination. The output spindles of the three integrators $I_x$, $I_y$ and $I_z$ are therefore coupled to three numerical counters $K_x$, $K_y$ and $K_z$, respectively, that are bolted to the reclining mounting plate 79 of the machine frame (FIGURES 1 and 2) adjacent the integrators $I_x$, $I_y$ and $I_z$, respectively. The numbers appearing in the dials of said counters, upon completion of a test cycle represent data by means of which the reflectance or transmittance of an examined specimen may be identified in a subjective sense, i.e., as perceived by the average human eye.

Figure 11:
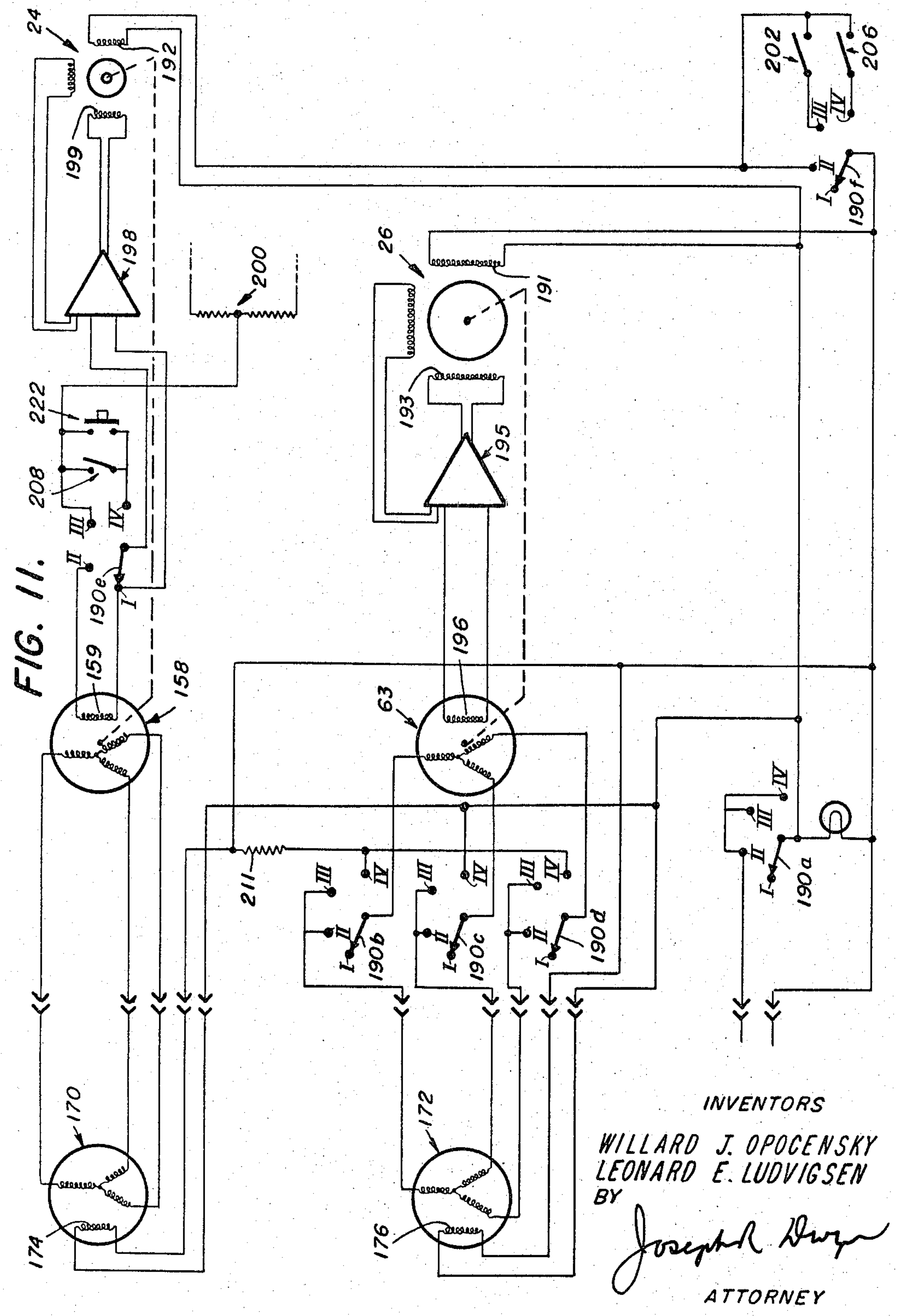
FIGURE 11 is an electric circuit diagram of the apparatus of the invention.

When employing the computing apparatus of the invention in practice, the wavelength motor 24 and the reflectance motor 26 are operated under control of two syncro systems including the hereinbefore mentioned synchro control transformers 158 and 63 and two remotely located synchro control transmitters 170 and 172, respetcively (FIGURE 11). In the event that the computing apparatus of the invention is employed to process the output of a spectrophotometer, the rotors 174 and 176 of the control transmitters 170 and 172 are mechanically coupled to the wavelength output shaft and the reflectance output shaft, respectively, of the spectrophotometer. The apparatus of the invention includes a program switch collectively identified by the reference numeral 180 (FIGURES 1, 2, 3, 7 and 12) whose control knob 182 may be manually set from an "Off" position at which power is cut off from the rotors of the control transmitters 170 and 172 and from the reference windings of the servo motors 24 and 26, and wherein the stator lines of the synchro system for the wavelength motor 24 are interrupted (FIGURE 11) to an "On" position wherein power is supplied to the rotors of the control transmitters and to the reference windings of the servo motors, and wherein the stator lines of the synchro systems for the wavelength motor 24 are closed.

Having reference to FIGURES 1, 11, and 12, the program switch 180 has a vertical shaft 184, and secured to said shaft directly below the control knob 182 is a dial 186 that bears inscriptions which identify the rotary positions of the switch 180 with regard to a stationary reference point. This reference point may be indicated by an arrow (FIGURE 3) that may be marked upon a shelf 187 which supports the switch 180 and which is in turn supported from the top of the inclined mounting plate 79 of the machine frame (FIGURE 1). Arranged around the shaft 184 below the dial 186 are six vertically spaced, stationary disks or decks $188_a$, $188_b$, $188_c$, $188_d$, $188_e$, and $188_f$, respectively. (FIGURE 12) each provided with four angularly equi-sapced terminal points I, II, III and IV that may successively be engaged by contact arms $190_a$, $190_b$ $190_c$, $190_d$, $190_e$ and $190_f$, respectively, which are secured to and operated by the shaft 184 at the level of the decks $188_a$ to $188_f$.

When the knob 182 of program switch 180 is in the "Off" position, the five switch arms $190_a$ to $190_f$ all rest upon neutral contact points I, and the control circuitry of the apparatus is in a de-energized and disabled condition. When the knob is set to its "On" position, the arms $190_a$ to $190_f$ are moved into engagement with the contact points II on decks $188_a$ to $188_f$, respectively, and the apparatus is conditioned for cooperation with a remotely located data supplying machine. Thus, switch arm $190_a$ on deck $188_a$ is moved into a position wherein it closes power circuits through the rotors 174 and 176 of the control transmitters 170 and 172, respectively, (FIGURE 11), that are associated with the wavelength and reflectance output components of the remotely located spectrophotometer. At the same time said switch arm $190_a$ closes a power circuit through the reference winding 191 of the reflectance motor 26, and completes partially a power circuit through the reference winding 192 of wavelength motor 24. This last mentioned circuit is completely closed by the simultaneous movement of switch arm $190_f$ into engagement with contact point II on deck $188_f$. Thus, any rotation imparted to the rotor 174 by the wavelength output shaft of the spectrophotometer is transmitted to and causes a corresponding rotation of the wavelength servo motor 24 which drives the input disk 31 of integrator $I_0$, and the shaft 70 that carries the color perceptivity cams $C_x$, $C_y$ and $C_z$ which control the operation of the integrators $I_x$, $I_y$ and $I_z$, respectively, (FIGURES 9 and 10). The simultaneous movement of the three switch arms $190_b$, $190_c$ and $190_d$ into engagement with contact points II on decks $188_b$, $188_c$ and $188_d$, respectively, is effective to close the three stator lines of the synchro control system which includes control transmitter 172 and control transformer 63, and which controls the operation of the reflectance motor 26, and hence the position of snail cam 52 (FIGURES 9 and 11). The simultaneous movement of switch arm $190_e$ into engagement with contact point II on deck $188_e$ is effective to connect the output terminals of rotor 159 of control transformer 158 to an amplifier 198 so that the control voltage developed across said terminals may be applied in amplified form to the control winding 199 of wavelength motor 24. This causes said motor to turn in synchronism with rotations that may be appiied to the rotor 174 of control transmitter 170 by the wavelength output component of the photospectrometer. With the arms $190_b$, $190_c$ and $190_d$ in positions wherein they complete the stator lines of the synchro system for the reflectance motor, and with power supplied to the rotor 176 of control transmitter 172 and to the reference winding 191 of the reflectance motor 26, any voltages generated by oscillating the rotor 176 of control transmitter 172 in said stator lines, produce corresponding output voltages across the terminals of the rotor 196 of control transformer 63. These voltages are applied to the control winding 193 of the reflectance motor 26 through an amplifier 195 and cause said motor to turn in synchronism with the oscillations of the rotor 176 of control transmitter 172. In this manner the snail cam 52 is oscillated in synchronism with the reciprocations of the reflectance output component of the spectrophotometer. Thus, when the program switch 180 is set to its "On" position, the apparatus of the invention is operatively coupled to the remotely located data supplying machine, and will operate to process the output of said machine continually for as long as the switch 180 remains in its "On" position.

Complex integrator systems of the type employed in the apparatus of the invention are subject to errors which may be caused, for instance, by misalignment or wear of the color perceptivity cams or by misoperation of the integrators and/or the counters. When a computing apparatus of the type described hereinbefore, appears to deliver erroneous results during cooperation with data supplying machines it is frequently difficult to determine whether suspected errors in the final results of the computations are due to malfunctioning of the computing apparatus or of the data supplying machine. The present invention, provides an arrangement by means of which the operation of the computing apparatus may be checked independently from any cooperation with a data supply machine. In accordance with the invention the program switch 180 is arranged, upon proper manipulation, to establish conditions in the control circuitry of the computing apparatus that set the cams $C_x$, $C_y$ and $C_z$ on shaft 70 automatically to a start or full-cycle position.

Furthermore, the program switch is arranged, upon proper manipulation, to cause the wavelength servo motor 26 to rotate the color sensitivity cams $C_x$, $C_y$ and $C_z$ through a predetermined angle from said start position independently from any control by a remotely located synchro-control transmitter so that the accuracy of the results supplied by the computing apparatus of the invention may at any time be checked independently from a data supplying machine. When the color perceptivity cams are turned through an angle corresponding to a predetermined spectrum, such as the spectrum of visible wavelengths, with the reflectance shaft 22, and hence the snail cam 52 and the ball bearing carriage 32 of integrator $I_0$ held stationary in a predetermined position, each of the three counters $K_x$, $K_y$ and $K_z$ must register a predeterminable number of rotations, provided the apparatus of the invention operates accurately, i.e. provided the color perceptivity cams on shaft 70 are properly aligned and all the four integrators $I_0$, $I_x$, $I_y$ and $I_z$ of the apparatus are in proper working condition. In addition, the invention provides means actuated by manipulation of program switch 180, for setting the snail cam 52 automatically to a plurality of angularly equispaced positions so that the accuracy check may be repeated for a plurality of selected different settings of integrator $I_0$.

In accordance with the invention, therefore, the program switch 180 has a third position marked "Reset" and when the switch is set to this position, the synchro system which controls operation of the wavelength motor 24 in synchronism with the wavelength output component of a remotely located data supply machine is disabled. In its place, an independent command signal is applied to the control winding 199 of the servo motor 24 (FIGURE 11) which signal is effective to turn said motor as long as said signal continues to be applied to the control winding 199 thereof and as long as the reference circuit of the motor remains energized. At a full cycle position of cam shaft 70, however, when all three of the color-perceptivity cams $C_x$, $C_y$ and $C_z$, present ineffective sectors of their edges to the cam follower rollers on the ball-carriage-supporting arms of the integrators $I_x$, $I_y$ and $I_z$, respectively, a control cam provided on said shaft 70 operates to open a switch arranged in the reference circuit of motor 24; and as a result thereof operation of the motor and hence of the shaft 70 comes to a halt, with the color-perceptivity cams in their proper starting positions and with power cut off from the reference winding 192 of the wavelength motor, but with the command signal still being applied to the control winding 199 of said motor.

Having reference to FIGURES 9, 10, 11 and 12, when the program switch 180 is set to its "Reset" position, arm $190_e$ engages the contact point II on deck $188_0$. This is effective to apply a command signal derived from a suitable source to the amplifier 198 which delivers it in amplified form to the control winding 199 of motor 24 causing the motor to turn. In the exemplary embodiment of the invention illustrated in FIGURE 11, said source is represented by a tapped resistor network 200 that may be shunted across a source of voltage such as a light line Movement of switch 180 to its "Reset" position also moves switch arm $190_f$ to contact point III on deck $188_f$. In this position arm $190_f$ connects a switch 202 into the reference circuit of the wavelength motor 24. Said switch is mounted upon the frame of the apparatus adjacent to cam shaft 70 (FIGURE 10) and is normally open, but is kept in a closed condition during performance of the apparatus by engagement of its actuating arm 203 with the contour of a control cam 204 on shaft 70. The contour of cam 204 contains a short depression 205, and when rotation of the shaft 70 moves said depression underneath the switch arm 203, the switch 202 is permitted to resume its normally open position and break the reference circuit of motor 24. As a result thereof, both the motor 24 and the cam shaft 70 come to a halt, while a command signal from source 200 continues to be applied to the control winding 199 of the motor. The angular position of the recess 205 in the contour to cam 204 is so chosen relative to the rotary position of the color-perspectivity cams $C_x$, $C_y$ and $C_z$ that said cams are in their starting position at this moment.

Rotation of program switch 180 from its "On" position to its "Reset" position remains without effect upon the conditions established by switch arms $190_n$, $190_b$, $190_c$ and $190_d$ since the contact points III on decks $188_a$, $188_b$, $188_c$ and $188_d$, respectively, are in all respects equivalent to the contact points II on said decks. The setting of switch 180 to its "Reset" position, therefore, does not affect the operativeness of the synchro system which controls the operation of the reflectance motor 26 in synchronism with the reciprocating motion of the reflectance output component of the remotely located spectro-photometer.

In its fourth or "Test" position, the program switch 180 is arranged to close the reference circuit of servo motor 24 through a cam controlled switch 206 (FIGURE 11) that is closed when the cam shaft 70 is in the full cycle position to which it has been set by the described "resetting" operation. At the same time, said program switch 180 operates to connect a cam controlled switch 208 into the input circuit of the amplifier 198 for the control winding 199 of servo motor 24. Said switch 208 is open in the full cycle position of the cam shaft 70 so that no command signal can reach the control winding 199 of the servo motor 24 and said motor remains initially at rest. In addition the setting of the program switch 180 to "Test" position is arranged to interrupt the stator lines of control transmitter 172 and thus disable the synchro system which controls operation of the reflectance motor 26 in synchronism with the reflectance output component of the remotely located data supplying machine. In its place, the program switch applies a predetermined fixed control signal to the stator windings of control transformer 63 to cause such an error voltage to appear across the output terminals of the rotor 196 of said transformer as will place the reflectance motor 26 into a predetermined rotary position. In the particular embodiment of the invention described hereinbefore and illustrated in the accompanying drawings, the transmission ratio between the reflectance shaft 22 and the snail 56 cam is such that the former has to make five complete revolutions to turn the snail cam 52 through one complete revolution. As a result thereof the setting of the reflectance motor 26 to a predetermined full cycle position by application of a predetermined command signal is effective to set the snail cam 52 always to the nearest one of five angularly equi-spaced test positions depending upon the rotary position of the snail cam at the moment when the command signal is applied to the stator windings of control transformer 63 by movement of program switch 180 to its "Test" position.

Figure 12:
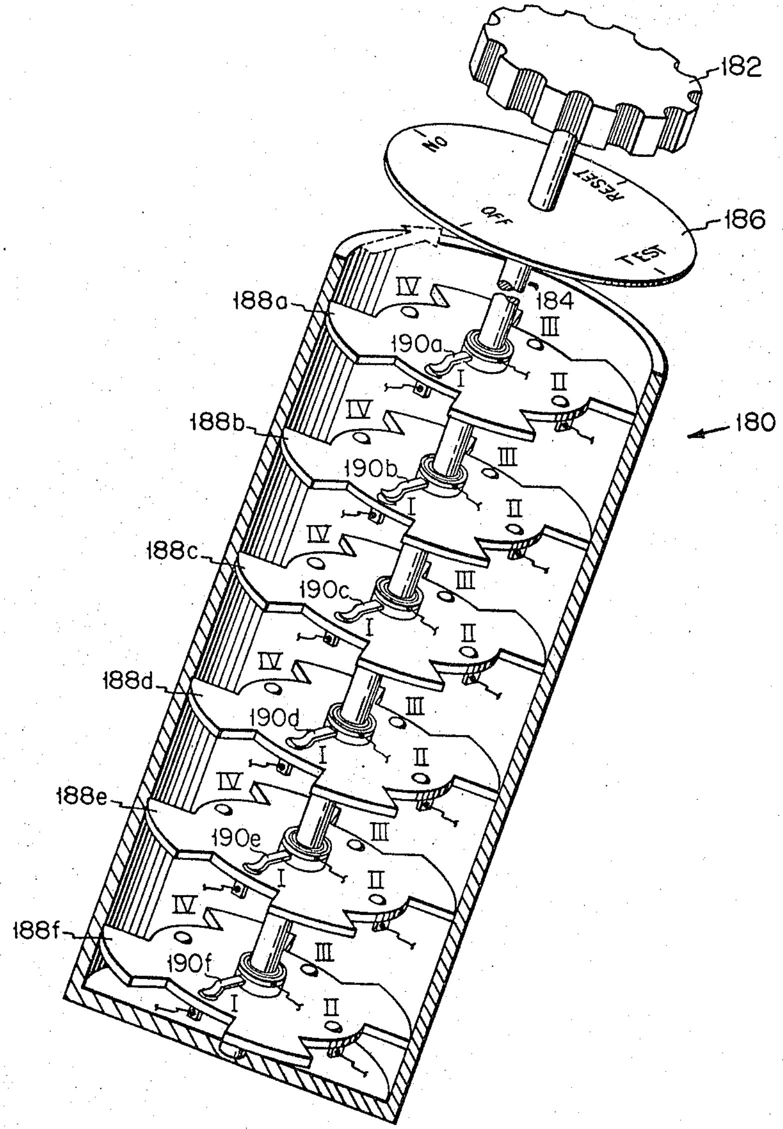
FIGURE 12 is a perspective, partly in section, of the program switch of the apparatus of the invention.

Having reference to FIGURES 11 and 12, movement of control knob 182 of program switch 180 into its test position, moves switch arm $190_a$ on deck $188_a$ into engagement with contact point IV. This contact point is equivalent with contact points II and III on the same deck and re-establishes the same conditions that existed when arm $190_a$ engaged contact points II and III on said deck. Movement of switch arms $190_b$, $190_c$ and $190_d$ on decks $188_b$, $188_c$ and $188_d$, respectively into engagement with contact of the points IV on said decks disconnects the stator windings of control transformer 63 from the corresponding stator windings of control transmitter 172, and in their place applies to said stator windings a signal which is derived from the power supply line and which is dimensioned by a resistor 211 to produce such an error voltage across the output terminals of rotor 196 as will move the reflectance servo motor 26 to its full cycle position. This is effective to place the snail cam 52 to the nearest one of the five available test positions wherein it remains during the succeeding test rotation of wavelength shaft 20.

The setting of switch arm $190_e$ on deck $188_e$ of program switch 180 into engagement with contact point IV connects the hereinbefore described signal source 200 to the amplifier 198 through switch 208 as mentioned hereinbefore (FIGURES 10, 11 and 12). Said switch is supported from the machine frame directly below the switch 202. Its actuating arm 212 is engaged by the edge of a control cam 214 that has a brief depression 216 and which is secured to the shaft 70 above and adjacent to the control cam 204 in angular alignment therewith. Hence, in the full cycle position of cam shaft 70 when cam 204 is in a rotary position in which it permits the switch 202 in the reference circuit of servo motor 24 to open, the cam 214 permits switch 208 to resume its normally open position and break the input circuit of amplifier 198. Thus when the program switch 180 is set to its "Test" position after it has previously been set to its "Reset" position, the command signal generated at source 200 cannot reach the control winding 199 of motor 24 through amplifier 198 and the motor, therefore, remains initially at rest even though its reference circuit may be closed in this fourth position of program switch 180.

Rotation of the program switch to its "Test" position is also effective to move the arm $190_f$ on deck $188_f$ into engagement with contact point IV on said deck. This movement of contact arm $190_f$ eliminates from the reference circuit of wavelength motor 24 the cam-controlled switch 202, and in its place connects another cam-controlled switch 206 into said reference circuit (FIGURE 11). Said switch 206 is a normally open switch that is, however, closed in the full cycle position of shaft 70. It has an actuating arm 207 (FIGURE 10) that is engaged by the edge of a cam 218 which is secured to the cam shaft 70 near the lower end thereof and which maintains the switch 206 in closed condition during the greater part of each revolution of cam shaft 70. The edge of said cam 218 has a short depression 220 which permits switch 206 to open and break the reference circuit of motor 24 whenever the cam shaft 70 has departed from its full cycle position by a predetermined angle which may, for instance, be chosen to encompass the sectors of the color perceptivity cams $C_x$, $C_y$ and $C_z$, that represent the spectrum of visible light.

The setting of program switch 180 to "Test" position, therefore, has the following effects. It disconnects the control transformer 63 which monitors the reflectance motor 26, from the control transmitter 172 that is associated with the reflectance output component of the remotely located data-supplying machine. It applies a locally generated signal to the stator windings of the control transformer 63 to produce such error voltages across the output terminals of the rotor 196 of said transformer as will move the reflectance serve motor 26 to its full cycle position. In its full cycle position the motor 26 sets the snail cam 52 to any one of a number of predetermined angularly equi-spaced test positions at which it remains as long as the position of the rotor 196 of control transformer 63 remains unchanged. Furthermore, the setting of program switch 180 to "Test" position interposes a cam-controlled switch 206 into the reference circuit of the wavelength motor 24 which switch is closed in the full cycle position of cam shaft 70, and it connects the control winding 199 of said motor to the local signal source 200 through another cam controlled switch 208 which is open when the cam shaft 70 is in its full cycle position.

The immediate result of setting the program switch 180 to its "Test" position, therefore, is such operation of the reflectance servo motor 26 as will place the snail cam 52 into a selected test position. Additonally, the reference circuit of the wavelength motor 24 is energized through a switch 206 which is closed when the cam shaft 70 is in its full cycle position, and the command circuit of the wavelength motor 24 is interrupted by a switch 208 which is open when the cam shaft is in its full cycle position. Hence, the wavelength motor 24 and the cam shaft 70 remain at rest while the reflectance motor 26 operates to set the snail cam 52 to one of its test positions.

With the cam shaft 70 in its starting position, and the snail cam 52 in one of its test positions the apparatus is now ready for a test run. To initiate a test run, it is necessary to depress a starter switch 222 (FIGURES 1, 4, 6 and 11) which is shunted across the switch 208 in the input circuit of the amplifier 198 so that the command signal from source 200 may reach the control winding 199 and start operation of the wavelength motor 24. It will be understood that the start switch 222 must be depressed for the time required by motor 24 to turn the cam shaft 70 through the angle necessary to withdraw the depression 216 in the contour of cam 214 from underneath the control arm 212 of switch 208 and effect closure of said switch. From then on, the command signal from source 200 will continue to cause the wavelength motor to turn until the depression 220 in the contour of cam 218 moves underneath the arm 207 of switch 206 and allows said switch to open. The rotary position of cam 218 relative to the rotary position of the cams 204 and 214, which latter cams determine the full cycle position of cam shaft 70, therefore determines duration of the test run, which may be so chosen as to cover a sector corresponding to the visible spectrum of light, and hence encompassing the effective sectors of all three of the color perceptivity cams $C_x$, $C_y$ and $C_z$ on shaft 70.

Upon completion of the test run, when the numbers appearing in the counters $K_x$, $K_y$ and $K_z$ have been checked, the apparatus may readily be reset to its full cycle or starting position by setting the program switch 180 back to its "Reset" position. With the command input line of motor 24 now connected directly to the signal source 200 and the reference circuit of said motor completed through switch 202 which is closed in all angular positions of the cam shaft except its full cycle position, the servo motor 24 commences operation until the reference circuit of said motor is disrupted by the switch 202 which is opened by the cam 204 on shaft 70 when said shaft reaches its full cycle position.

The test runs may now be repeated with other selected settings of the snail cam 52. It is merely necessary to operate the dial 210 to set the snail cam 52 roughly to the desired position and return the program switch 180 to its "Test" position. This is effective to set the snail cam precisely to its desired test position in the manner described above, whereupon depression of the "starter" button 222 initiates another test run of the apparatus through a desired spectrum of wavelengths as determined by appropriate adjustment of the rotary position of cam 218 upon shaft 70 relative to the starting position of the color perceptivity cams $Ca_x$, $Ca_y$ and $Ca_z$ and the switch control cams 204 and 214 which establish the full cycle position of the apparatus.

While we have explained our invention with the aid of an exemplary embodiment thereof, it will be understood that the invention is not limited to the specific constructional details shown and described by way of example, which may be departed from without departing from the scope and spirit of the invention.

We claim:

1. Arrangement for controlling the operation of a servomotor comprising reference and command circuits, an ordinarily closed first switch, first camming means operated by the motor for effecting opening of said first switch at a predetermined full cycle position of the motor, a second ordinarily closed switch, second camming means operating in unison with said first camming means for effecting opening of said second switch at said full cycle position, a normally closed third switch, third camming means operated by the motor for effecting opening of said third switch at a rotary position angularly displaced from said full cycle position, means selectively settable to a position wherein it applies a command signal to said command circuit and connects said second switch into said reference circuit to turn the motor to said full cycle position thereof; and a position wherein it applies a command signal through said first switch to said command circuit and connects said third switch into said reference circuit; and means operable to by-pass said first switch to turn the motor to said angularly displaced position thereof.

2. Arrangement for controlling the operation of a servo motor comprising reference and command circuits, a source of command signals, an ordinarily closed first switch, a second ordinarily closed switch, camming means operated by the motor for effecting opening of said first and second switches at a predetermined full cycle position of the motor, a normally closed third switch, second camming means operated by the motor for effecting opening of said third switch at a predetermined terminal position of the motor angularly displaced from said full cycle position, means selectively settable to a position wherein it connects said local source of command signals into said command circuit and said second switch into said reference circuit to turn the motor to said full cycle position thereof, and a position wherein it connects said local source of command signals and said first switch into said command circuit and said third switch into said reference circuit to condition the motor for a test run from said full cycle position thereof; and means manually operable to by-pass said first switch in said command circuit to start operation of said motor under control of said local source of command signals until said second camming means effects opening of said third switch in said reference circuit to terminate the test run at said predetermined terminal position of the motor.

3. Arrangement for controlling the operation of a servomotor comprising reference and command circuits, a control transformer having a rotor winding, a local source of command signals, an ordinarily closed first switch, a second ordinarily closed switch, a second camming means operated by the motor for effecting opening of said switches at a full cycle position of the motor, a normally closed third switch, third camming means operated by the motor for effecting opening of said third switch at a predetermined terminal position angularly displaced from said full cycle position, means selectively settable to a first position wherein it connects said rotor winding into said command circuit to effect rotation of said motor under control of said transformer, a second position wherein it connects said local source of command signals into said command circuit to effect rotation of the motor independently of said transformer and said second switch into said reference circuit to terminate operation of the motor at said full cycle position thereof, and a third position wherein it connects said local source of command signals and said first switch in open position into said command circuit and third third switch in closed condition into said reference circuit to condition the motor for a test run from said full cycle position thereof; and means manually operable to by-pass said first switch in said command circuit to start operation of said motor under control of said local source of command signals until said third camming means effects opening of said third switch in said reference circuit to terminate the test run at said predetermined terminal position of the motor.

References Cited

UNITED STATES PATENTS

| | | | |
|---|---|---|---|
| 2,429,605 | 10/1947 | Brannin | 318—24 |
| 2,790,121 | 4/1957 | Matin | 318—24 |
| 2,853,665 | 9/1958 | Choudhury | 318—24 |
| 3,131,350 | 4/1964 | Canaday et al. | 318—24 |
| 3,271,643 | 9/1966 | Lingel | 318—30 |

FOREIGN PATENTS

| | | |
|---|---|---|
| 611,992 | 11/1948 | Great Britain. |

BENJAMIN DOBECK, *Primary Examiner.*